United States Patent [19]

Olofsson

[11] 4,380,024
[45] Apr. 12, 1983

[54] AIRBORNE VEHICLE REFERENCED (OUTSIDE WORLD) RECORDING DEVICE UTILIZING AN ELECTRO-OPTICAL CAMERA AND AN ELECTRONIC ALIGNMENT PROCEDURE

[76] Inventor: Hasse E. O. Olofsson, 25 Nämndemansbacken, Enskede, Sweden, S-122 36

[21] Appl. No.: 208,282

[22] Filed: Nov. 19, 1980

[30] Foreign Application Priority Data

Nov. 19, 1979 [SE] Sweden .................................. 7909530

[51] Int. Cl.³ .............................................. H04N 7/18
[52] U.S. Cl. ...................................... 358/93; 358/103; 358/107
[58] Field of Search .................... 358/103, 213, 107, 93

[56] References Cited

U.S. PATENT DOCUMENTS

| | | | |
|---|---|---|---|
| 3,278,680 | 10/1966 | Hummel | 358/103 |
| 3,484,549 | 12/1969 | Ricketts | 358/103 |
| 3,507,993 | 4/1970 | Mulley | 358/103 |
| 4,280,141 | 7/1981 | McCann | 358/213 |

*Primary Examiner*—Howard Britton
*Attorney, Agent, or Firm*—Fisher, Christen & Sabol

[57] ABSTRACT

An arrangement for electronic recording of outside world and display symbol registration in airborne vehicles provided with head up display. A recording camera is calibrated with close tolerances to the same reference axes as the head up display's display symbology. Control signals of the display symbology and output signals from the camera are processed and combined in an electronic unit for simultaneous recording in a recorder, e.g., a tape recorder.

7 Claims, 6 Drawing Figures

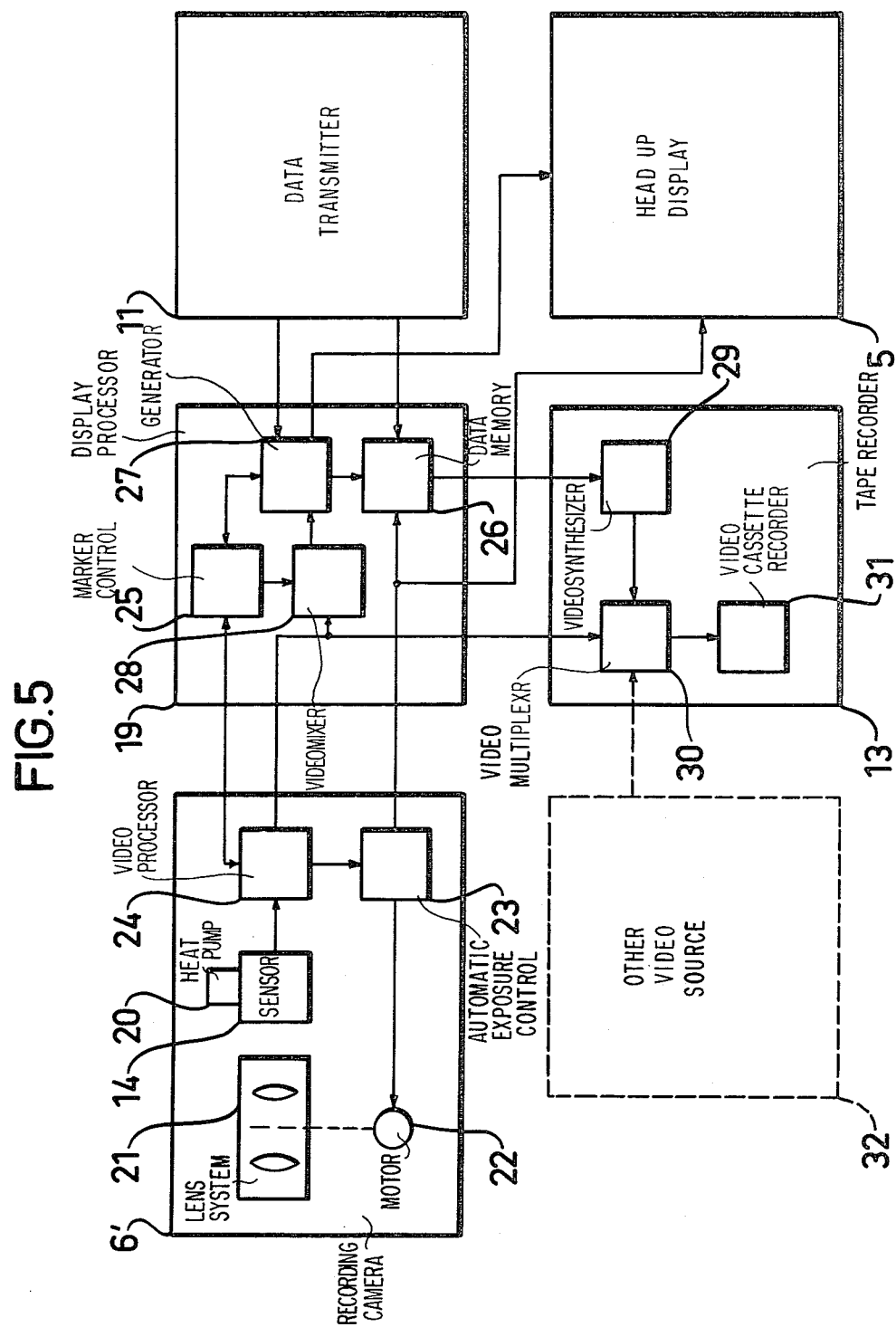

AIRBORNE VEHICLE REFERENCED (OUTSIDE WORLD) RECORDING DEVICE UTILIZING AN ELECTRO-OPTICAL CAMERA AND AN ELECTRONIC ALIGNMENT PROCEDURE

BACKGROUND OF THIS INVENTION

1. Field of This Invention

This invention relates to airborne vehicle referenced recording devices.

2. Prior Art

In airborne systems there is a need to record information displayed to the pilot, which is to be used for training, pilot performance evaluation, accident investigation or other purposes. In vehicles equipped with a so called Head-Up Display, information regarding attitude, course, etc., is presented to the pilot by means of a combining element, which allows such information to be superimposed on the outside world, with the pilot seeing such through the combiner. In order to record the composite data and outside world view as seen by the pilot, it has been necessary to employ a camera located between the pilot and the combiner.

This method has considerable disadvantages because the camera can not simultaneously expose the outside world and the total display seen by the pilot with sufficient resolution and accuracy. Furthermore, the optical part of the camera interfers with the pilot's outside view, which in some cases requires special procedures from his side during the flight mission. Due to these disadvantages the camera is attached only in missions where recording is urgent enough that the disturbance, caused by the application of the camera, can be accepted.

BROAD DESCRIPTION OF THIS INVENTION

This invention eliminates the disadvantages at the same time that a rational and simplified overall system solution is obtained with which the recording of the whole or a part of the flight mission can be made for convenient use for the above mentioned purposes.

This invention is based upon a system for the electronic recording of the outside world by means of a camera (e.g., a CCD-type) and a recorder (e.g., tape or other storage medium) combined with an electronic alignment procedure.

Otherwise only earlier known components or equipment are used.

The possibility of processing the electronic signals from the camera so that the recorded picture on playback corresponds to the picture which the pilot at the time of exposure saw with the head up display presentation superimposed on the outside world, is also covered by this invention.

IN THE DRAWINGS

FIG. 5 is a schematic diagram showing the signal pressing in an airborne system.

Figure 1:
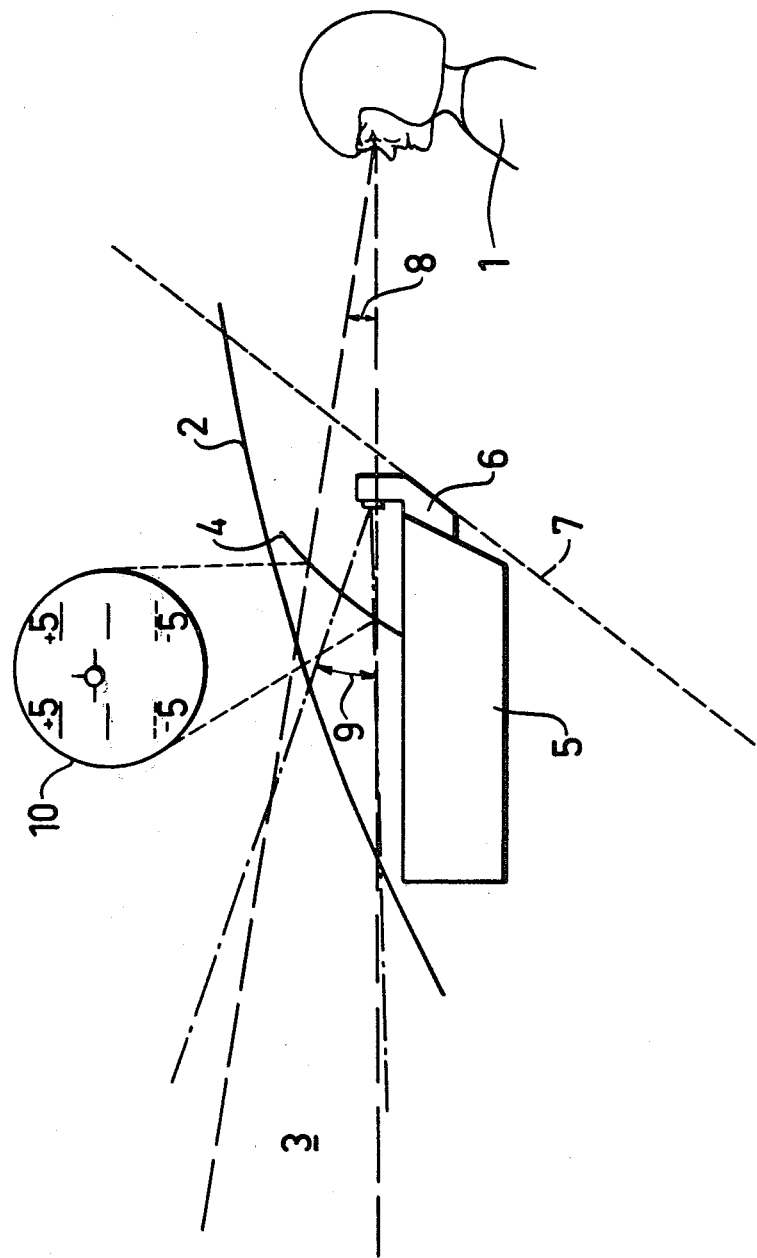
FIG. 1 is a schematic diagram of the currently used procedure.

FIG. 1 shows a schematic longitudinal cut through an aircraft cockpit, where the pilot 1 looks through the windshield 2 towards the outside world 3. In the pilot's field of view straight ahead is the head up display 5 with its combiner 4. On this displayed symbols 10, within the pilot's field of view 8, are superimposed on the outside world 3. The recording camera 6 with the aperture angle 9 is removably mounted on the head up display's back end. The line 7 marks the front limit for the pilot's free launching with his ejection seat. The earlier mentioned disadvantages with this camera arrangement appears in the figure without further specific description.

Figure 2:
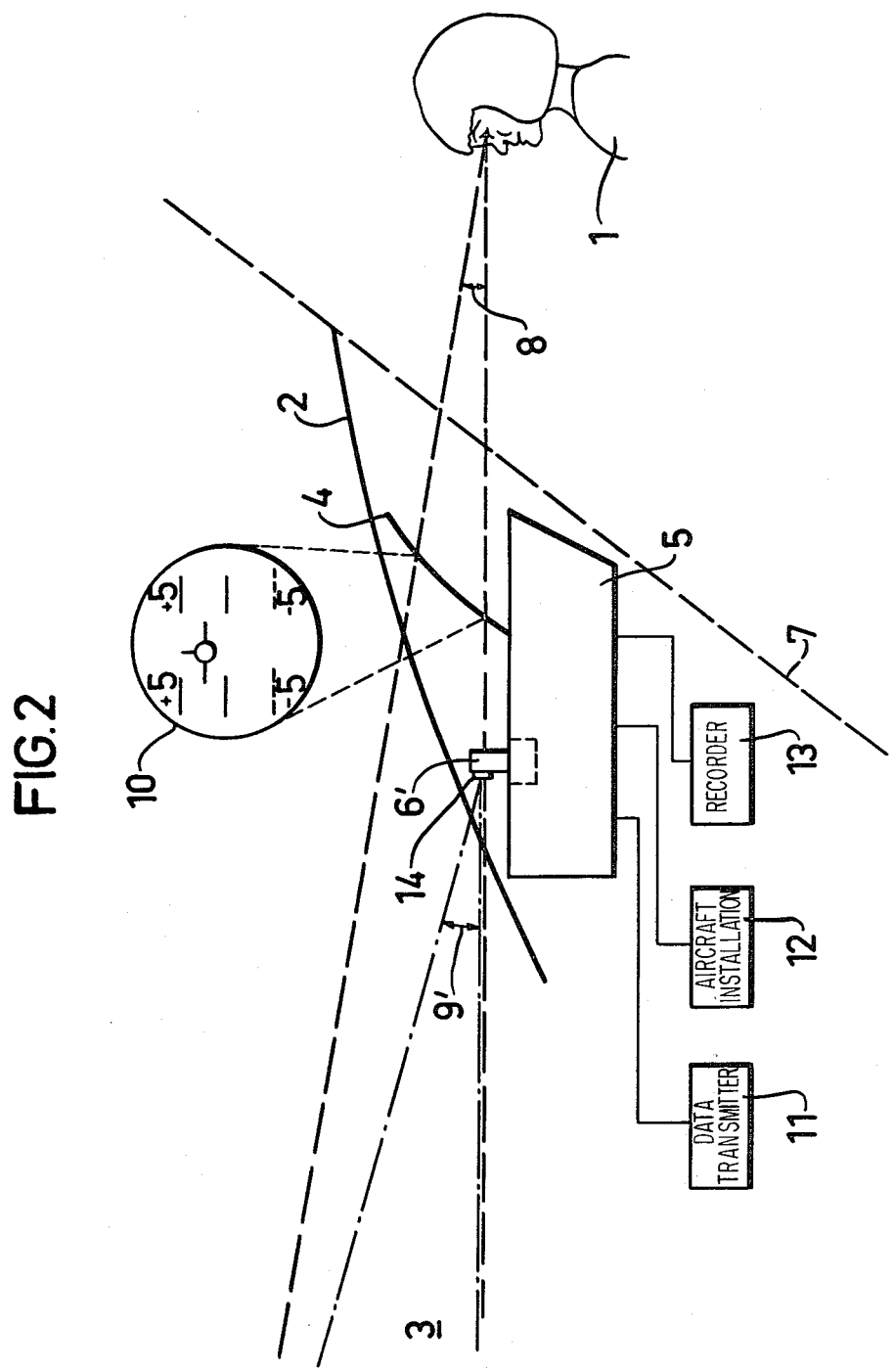
FIG. 2 is a schematic diagram of an arrangement according to this invention.

In FIG. 2 is shown an application of the invention in a similar sketch as FIG. 1. FIG. 2 shows the pilot 1, the windshield 2, the outside world 3, the head up display 5 with the combiner 4, the limit for free launching with ejection seat 7, the pilot's field of view with display 8, and display symbology 10. The recording camera 6', of CCD-type or similar, with the aperture angle 9' is located and permanently mounted on the head up display 5 between the combiner 4 and the windshield 2, through which the outside world 3 is exposed. After correction for the aircraft installation 12, the signals representing the electronic picture of the outside world from the camera 6', are coordinated and mixed with the signals representing the display symbology 10 in the head up display 5 and recorded on a tape recorder (or other storage medium) 13. Other data available in the aircraft besides logical control functions for exposure and recording, can be fed from a data transmitter 11 for simultaneous recording on the recorder 13. The brightness of the display symbology 10 and the camera 6's aperture are controlled automatically by a sensor 14 in the camera 6'.

Figure 3:
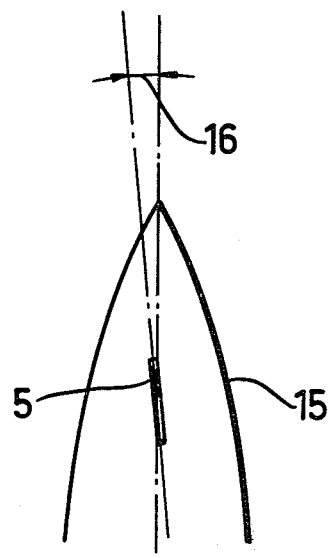
FIG. 3 is a schematic diagram showing certain angular relations in connection with the invention.

FIG. 3 shows schematically the mechanical angular deviation 16, which can appear in the horizontal plane between the reference axes for the aircraft 15 and the head up display 5. Corresponding alignment error can also exist in the vertical plane.

Figure 4:
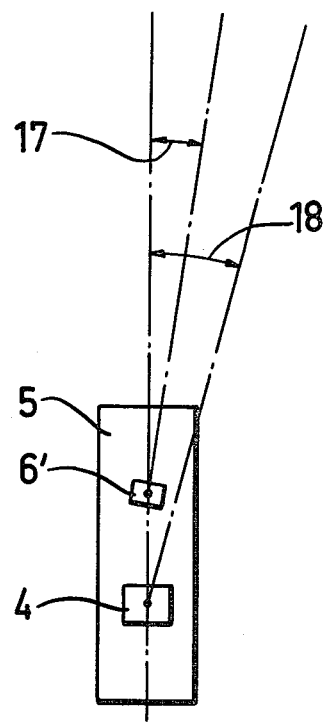
FIG. 4 is a schematic diagram showing certain angular relations in connection with the invention.

FIG. 4 shows the angular deviations 17 and 18, respectively, which can appear between the head up display 5's reference axis and the O-axis for the camera 6' and the display symbology 10, when the camera is firmly mounted on the head up display.

In a camera of CCD-type or similar, the sensed picture is exposed on a mechanically firm matrix of highly sensitive material, where it is transformed to electrical signals, which are processed in the same manner as other electrical signals and recorded, e.g., on a tape recorder. Because the camera 6' is firmly mounted on the head up display 5, the exposed picture of the outside world is permanently referred to the head up display 5. FIG. 3 shows that the aircraft 15 and the head up display 5's reference systems do not generally coincide. A mechanical and/or electrical alignment is necessary. This can be done with conventional methods, so that the angular deviation 16 will be zero, with a given accuracy.

By placing the camera 6' according to this invention, it will not expose the display symbology. Instead, the signals from the camera and the signals representing the display symbology are processed and combined so that they represent what the pilot sees through the combiner. This processing and combining of the signals is performed in a signal coordination unit, which can be a part of the head up display 5's electronic unit or the recorder 13. The recording can also be done before the signals are processed and combined, in which case signal coordination and eventual correction is required on a later playback.

Since the camera 6' is mounted on the head up display 5, the angular deviations 17 and 18 according to FIG. 4 can be brought to zero mechanically and/or electrically during assembly of the equipment in the production phase or in a maintenance workshop with calibration facilities.

Through the arrangements described, the information recorded during the flight can be used directly for evaluation. This also means that the procedures necessary with the present recording techniques before, during and after flying are greatly simplified, as only removal and replacement of a tape cassette is required.

In the description above it is assumed that the camera 6' is mounted on the head up display 5. The camera can of course be given another location in the aircraft, in which case other correction factors are required for its alignment with the head up display. In that case the required correction can be determined, for example, by comparing the camera exposed aircraft referred fixed picture of an given outside world with a, on the head up display's combiner 4 for this purpose displayed calibration symbols position against the same given outside world. Alternatively a testing device of theodolite-type can be used instead of the head up display.

The sensor 14 is primarily used to continuously obtain a correct positioning of the camera 6's aperture and to control the brightness of the head up display symbology 10, so that it is well adapted to actual light in the outside world. Secondarily the signal from the sensor 14 can be recorded on the recorder and at the evaluation of the recorded data give information about actual light conditions during the flight.

The degree of system facilities and function in a recording system depends on the aircraft it is used in.

A simple system, e.g., for civil aviation, can consist of a camera video and data recording unit with playback via an electronic unit on a TV-monitor. An advanced system, e.g., for a military combat, consist of a multisensor and data recording unit with a complete ground based multidisplay system.

Figure 6:
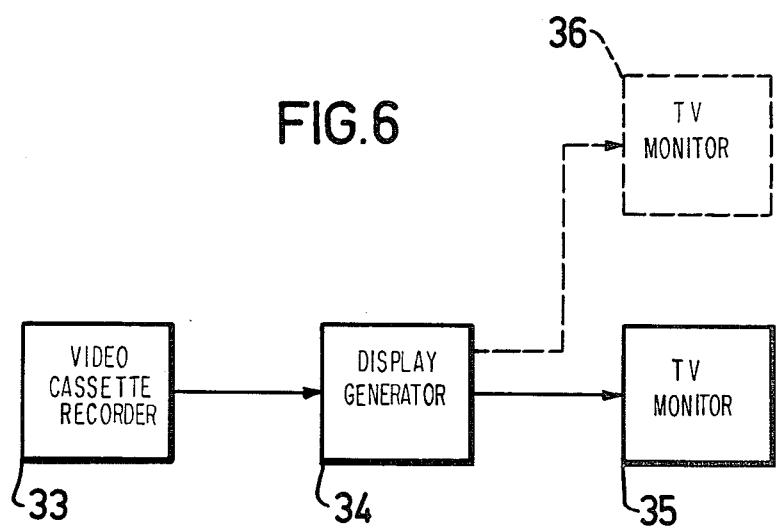
FIG. 6 is a schematic diagram showing the ground based equipment for playback.

A developed system is shown in FIG. 2 and by means of block diagram in FIGS. 5 and 6. In this system the video camera 6' is firmly mounted on the head up display 5 and located between its combiner 4 and the windshield 2. The camera is used for recording of the outside world through the windshield and without superimposed symbology. It has a solid state television sensor of CCD-type and is equipped with an inter-changeable lens having a field of view of for example 16'×22'. The camera is mechanically integrated with the head up display which implies that it does not interfer with the pilot's outside view.

The CCD-sensor 14 is temperature controlled by a heat pump 20 to achieve a high signal to noise ratio. The lens system 21 has an iris which is driven by a motor 22 controlled by the automatic exposure control 23 sensing the video level from video-processor 24 to adapt the sensitivity to the actual light conditions over a large dynamic range. The iris position and hence the ambient light conditions are signalled to the display processor 19 for coding and simultaneous recording on the recorder 13. This signal is also fed to the head up display 5 for automatic brightness control of the display symbology 10.

The video processor 24 of the camera 6' is synchronized by the display processor 19 in order to time the marker control 25 for the identification of the picture elements of the sensor. The display processor 19 has a data memory 26 in which the processor and generator 27 data are recorded. These data are symbol data for the head up display symbology 10 and alignment data for appropriate symbol compensation according to the angular deviation 17 and 18. The iris position is also recorded in the data memory 26. Other data needed for ground evaluation and not available in the display processor, e.g., engine data can also be recorded in the data memory 26 via data transmitter 11.

The data memory 26 consists of two alternating parts, where one part is used as data buffer for data from the processor and generator 27, the data transmitter 11 and the camera 6' when the other part is used for recording in the recorder 13. The alternation is controlled by the video field rate of the video camera 6' and the buffers alternate on the field synchronization signal. Data buffered during one field period will be recorded in the next field period.

The recorder 13 reads the data from the data memory 26 and performs required coding according to magnetic tape performances concerning noise, drop-outs, etc., and generates a synthetic video signal in a coder and videosynthesizer 29. This video signal is mixed into the upper and lower video lines of the image video from camera 6' in a video multiplexer 30. Approximately 20% of the image area is used for the data instead of the sensor image. The equipment also incorporates facilities for multiplexing other video sources 32, e.g., radar, FLIR, missiles, into the video signal to be recorded. The obtained video signal is passed to a video cassette recorder 31 for recording. The recorder 31 is also used for the simultaneous recording of radiocommunication, pilot comments, audio warnings, etc., on a separate audio track.

Because the recorded image 3 shall be used in a groundbased equipment for superimposing of the head up display symbology 10, an alignment procedure is performed to enable compensation for mechanical and electrical deviation between the camera and electrical deviation between the camera image and the head up display symbology. This is done for each aircraft installation and when needed by moving a marker in the camera image on a display until coincidence between an aiming point in the head up display over an outside object and the marker over the same object in the image is reached. The marker is mixed into the video signal by the vidomixer 28. The deviation between the image and the head up display symbology is computed by the display processor 19 and recorded in order to accurately reproduce the outside world image with head up display symbology superimposed. The alignment is done for some points to enable appropriate compensation for scaling, translation and rotation when computing and superimposing the head up display symbology in a ground based equipment.

The groundbased equipment schematically shown in FIG. 6 consists of a video cassette recorder 33, a display generator 34 and a TV-monitor 35, 36.

The play-back is done on a video cassette recorder 33. A video signal analyzer and decoder in the display generator 34 separates the camera image and recorded data. The head up display symbol data and alignment data are used in the display generator 34 in order to give a automatic correction of the symbols for accurate superimposing onto the forward looking camera image. Facilities to handle more than one sensor-image as well as other data are incorporated. The groundbased equipment gives a reproduction of the pilot's view in the aircraft with the head up display symbology superimposed onto the outside world.

What I claim is:

1. Arrangement for electronic recording of outside world and display symbol registration in airborne vehicles comprising an electronic recording camera, a head up display and a recorder characterized in that the camera is calibrated with close tolerances to the same reference axes as the head up display's display symbology, the output signals from said camera and control signals of said display symbology being processed and combined in an electronic unit for simultaneous registration in the recorder.

2. Arrangement according to claim 1, characterized in that the camera is of CCD-type and is a permanently mounted part of the head up display.

3. Arrangement according to claim 2, characterized by a common automatic brightness control for the cameras aperture and the display symbology of the head up display.

4. Arrangement according to claim 3, characterized in that the control signal of said common automatic brightness control also is recorded.

5. Arrangement according to claim 1, characterized in that the camera is a CCD-type camera and the recorder is a tape recorder.

6. Arrangement according to claim 1, characterized in that the calibration is done by mechanical calibration means.

7. Arrangement according to claim 1, characterized in that the calibration is done by electrical calibration means.

* * * * *